US012750803B2

(12) United States Patent
Sarkis et al.

(10) Patent No.: US 12,750,803 B2
(45) Date of Patent: Sep. 29, 2026

(54) SIDELINK POSITIONING ANCHOR CLASSIFICATION AND SELECTION

(71) Applicant: QUALCOMM Incorporated, San Diego, CA (US)

(72) Inventors: Gabi Sarkis, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 461 days.

(21) Appl. No.: 18/189,645

(22) Filed: Mar. 24, 2023

(65) Prior Publication Data

US 2024/0323893 A1 Sep. 26, 2024

(51) Int. Cl.
*H04W 64/00* (2009.01)
*H04L 5/00* (2006.01)

(52) U.S. Cl.
CPC .......... *H04W 64/00* (2013.01); *H04L 5/0051* (2013.01)

(58) Field of Classification Search
CPC .... H04W 64/00; H04W 92/18; H04L 5/0051; G01S 5/0205
See application file for complete search history.

(56) References Cited

U.S. PATENT DOCUMENTS 11,445,334 B1 * 9/2022 Bao .......................... H04W 4/02
12,058,764 B2 * 8/2024 Michalopoulos ..... G01S 5/0236
2022/0317229 A1 * 10/2022 Baek ..................... H04W 64/00
2022/0417897 A1 12/2022 Wang et al.
2023/0061043 A1 * 3/2023 Wu ....................... H04W 72/20
(Continued)

FOREIGN PATENT DOCUMENTS

WO WO-2016048509 A1 * 3/2016 ............ H04W 64/00
WO WO-2022034484 A2 * 2/2022 ........... G01S 13/765
(Continued)

OTHER PUBLICATIONS

Futurewei: "Potential Solutions for Sidelink Positioning", 3GPP Draft, 3GPP TSG RAN WG1 #110bis-e, R1-2208372, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052276299, 7 pages, the whole document.
(Continued)

*Primary Examiner* — Charles N Appiah
(74) *Attorney, Agent, or Firm* — Thien T. Nguyen

(57) ABSTRACT

In an aspect, a target sidelink user equipment may obtain at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof. The target sidelink user equipment may engage in the positioning session with or using one or more SL anchor devices of the plurality of SL anchor devices, wherein the one or more SL anchor devices are selected for the positioning session based on the at least one quality classification indication associated with each of the one or more SL anchor devices.

30 Claims, 10 Drawing Sheets

(56) References Cited

U.S. PATENT DOCUMENTS

| | | | | |
|---|---|---|---|---|
| 2023/0127485 | A1* | 4/2023 | Sun | H04L 5/0053 370/329 |
| 2023/0213608 | A1* | 7/2023 | Sirotkin | G01S 1/042 455/456.1 |
| 2024/0114476 | A1* | 4/2024 | Oteri | H04W 72/25 |
| 2024/0272294 | A1* | 8/2024 | Keshavamurthy | H04W 64/00 |
| 2024/0356699 | A1* | 10/2024 | Li | H04W 64/00 |

FOREIGN PATENT DOCUMENTS

| | | | | |
|---|---|---|---|---|
| WO | 2022211889 | | 10/2022 | |
| WO | WO-2023076894 | A1 * | 5/2023 | H04W 4/025 |

OTHER PUBLICATIONS

International Search Report and Written Opinion—PCT/US2024/014063—ISA/EPO—May 8, 2024.

* cited by examiner

500

QUALITY OF SYNCHRONIZATION
(PRIORITIZATION BASED ON SYNC SOURCE)

| PRIORITY LEVEL | SYNCHRONIZATION SOURCE |
|---|---|
| P0 | Anchor directly synchronized to GNSS |
| P1 | Achor indirectly synchronized to GNSS |
| P2 | Anchor directly synchronized to base station (gNB/eNB) |
| P3 | Anchor indirectly synchronized to base station (gNB/eNB) |
| P4 | Anchor synchronized to a local independent synchronization source |
| P5 | Anchor indirectly synchronized to a device using any other independent synchronization source |

*FIG. 5*

SIDELINK POSITIONING ANCHOR CLASSIFICATION AND SELECTION

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a target sidelink user equipment (SL-UE) device includes obtaining at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engaging in the positioning session with or using one or more SL anchor devices of the plurality of SL anchor devices, wherein the one or more SL anchor devices are selected for the positioning session based on the at least one quality classification indication associated with each of the one or more SL anchor devices.

In an aspect, a target sidelink user equipment includes a memory; at least one transceiver; and at least one processor communicatively coupled to the memory and the at least one transceiver, the at least one processor configured to: obtain at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices.

In an aspect, a target sidelink user equipment includes means for obtaining at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and means for engaging in the positioning session with or using one or more SL anchor devices of the plurality of SL anchor devices, wherein the one or more SL anchor devices are selected for the positioning session based on the at least one quality classification indication associated with each of the one or more SL anchor devices.

In an aspect, a non-transitory computer-readable medium stores computer-executable instructions that, when executed by a target sidelink user equipment, cause the target sidelink user equipment to: obtain at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 is a table showing one manner in which a sidelink (SL) anchor device may be classified based on the synchronization source used by the SL anchor device, according to aspects of the disclosure.

DETAILED DESCRIPTION

Figure 1:
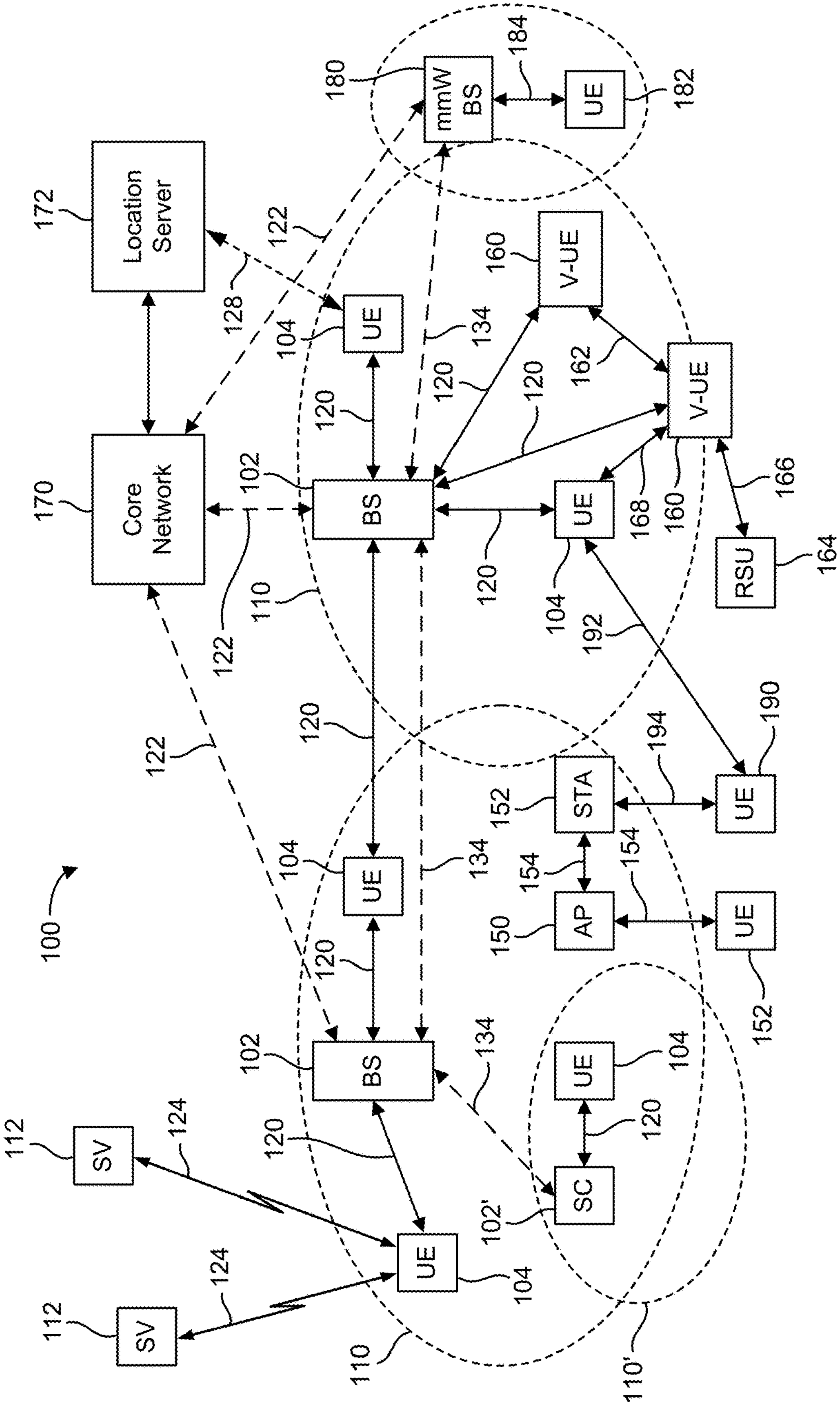
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to sidelink positioning using sidelink (SL) anchor devices. Some aspects more specifically relate to assigning quality classifications to the SL anchor devices, which may be used by a target sidelink UE (SL-UE) to select which SL anchor devices to use in a positioning session. In some examples, the quality classifications that may be assigned to an SL anchor device may be based on based on 1) a quality of synchronization of the SL anchor device. 2) a quality of timing of the SL anchor device, 3) a quality of a location estimate for a position of the SL anchor device, or 4) any combination thereof. In some examples, the target SL-UE obtains the quality classifications for an SL anchor device in a transmission from the SL anchor device. In some examples, the target SL-UE obtains the quality classifications for the SL anchor device in a transmission from a master SL device (e.g., an SL device charged with maintaining the quality classifications associated with each of the SL anchor devices in a positioning environment). In some examples, the quality classifications for the SL anchor device may be inferred from control signaling associated with PRS transmissions from the SL anchor device or the resource set allocated to the SL anchor device. In some examples, the target SL-UE may selectively include, exclude, combine, or weight the quality classification indications based on a prioritized quality classification configuration implemented at the target SL-UE device, the power consumption requirements of the target SL-UE device, the positioning method used by the target SL-UE device for the positioning session, how often sidelink positioning reference signals (SL-PRS) are transmitted by each of the SL anchor devices, an amount of communication traffic handled by each of the SL anchor devices, or any combination of the foregoing.

Particular aspects of the subject matter described in this disclosure can be implemented to realize one or more of the following potential advantages. In some examples, by assigning quality classifications to the SL anchor devices and providing the assigned quality classifications to the target SL-UE, the described techniques can be used to optimize the selection of the SL anchor devices that will be used by the target SL-UE for the positioning session. In some scenarios, the accuracy of the position estimate for the target SL-UE device will be increased by only using SL anchor devices having certain quality classifications for the positioning session. In some scenarios, the target SL-UE may reduce the number of SL anchor devices used in the positioning session based on the quality classifications thereby reducing the communication overhead needed for the positioning session and/or reducing the power consumed by the target SL-UE during the positioning session.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage arcas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHZ). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHZ) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHZ), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (cV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHZ. Other bands may be allocated in other countries. Thus, as a particular example, the medium of interest utilized by sidelinks 162, 166, 168 may correspond to at least a portion of the licensed ITS frequency band of sub-6 GHZ. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHZ (5.85-5.925 GHZ) in the U.S. In Europe, IEEE 802.11p operates in the ITS G5A band (5.875-5.905 MHZ). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHZ) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHZ.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
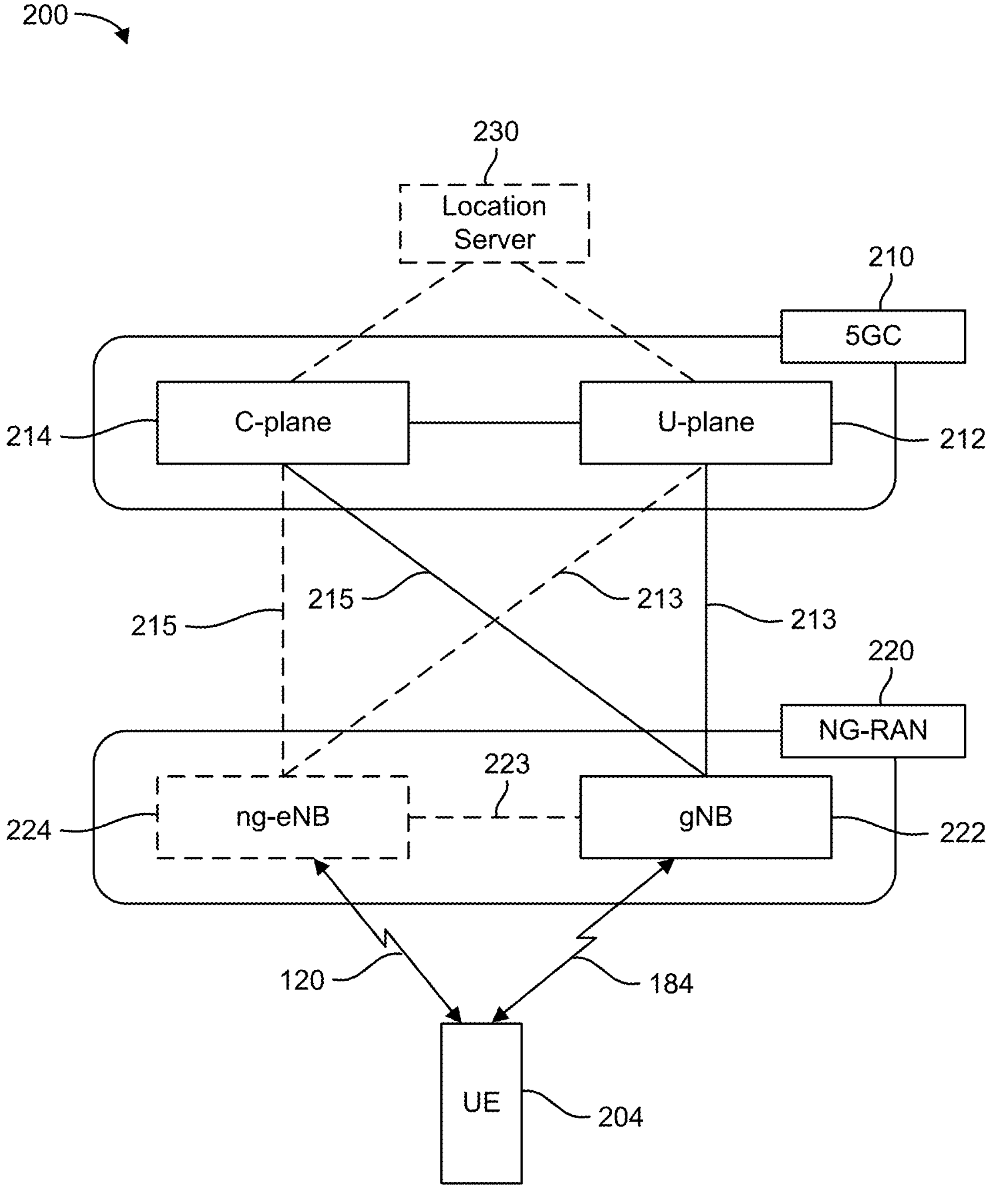
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
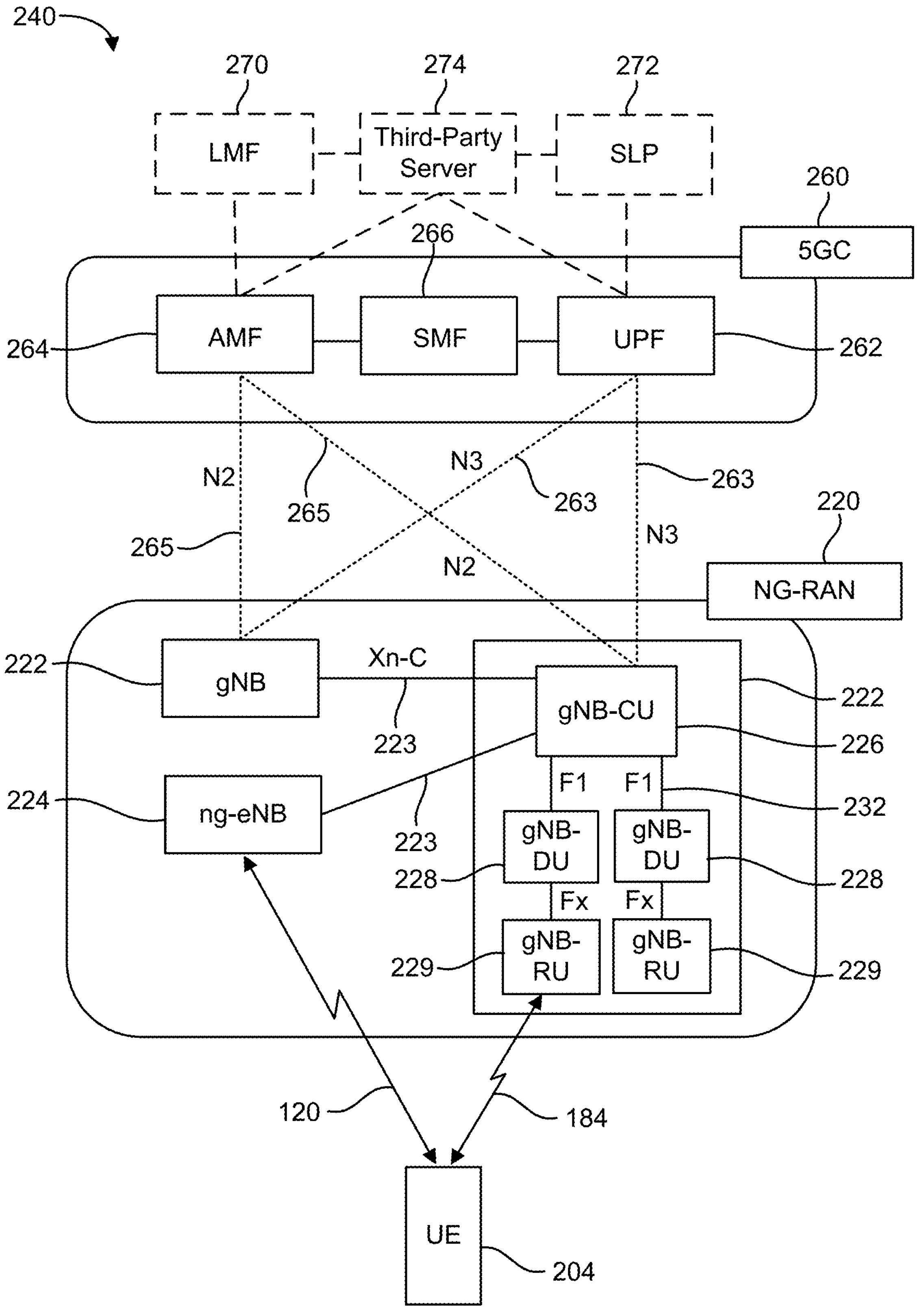

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
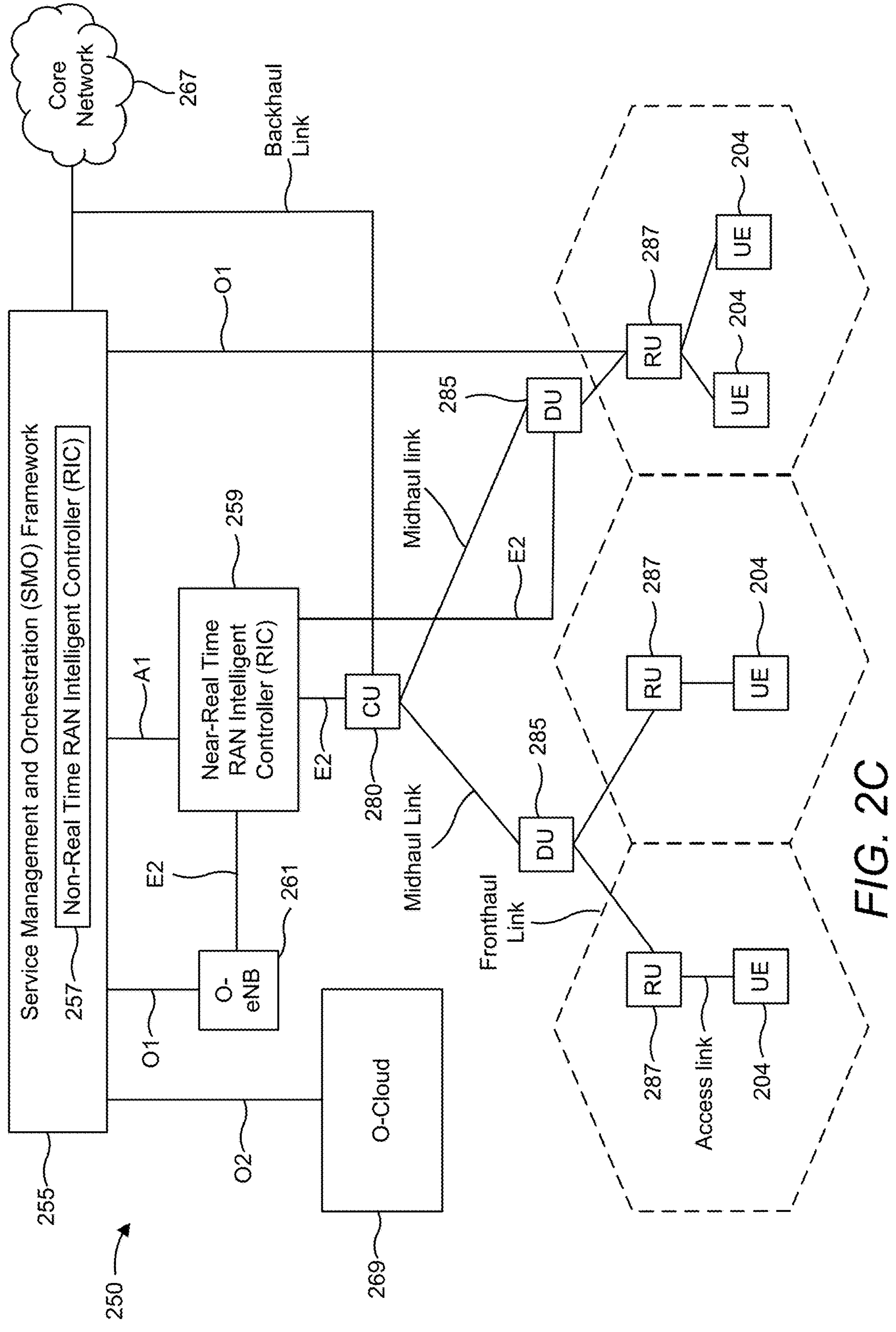

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via 01) or via creation of RAN management policies (such as A1 policies).

Figure 3A:
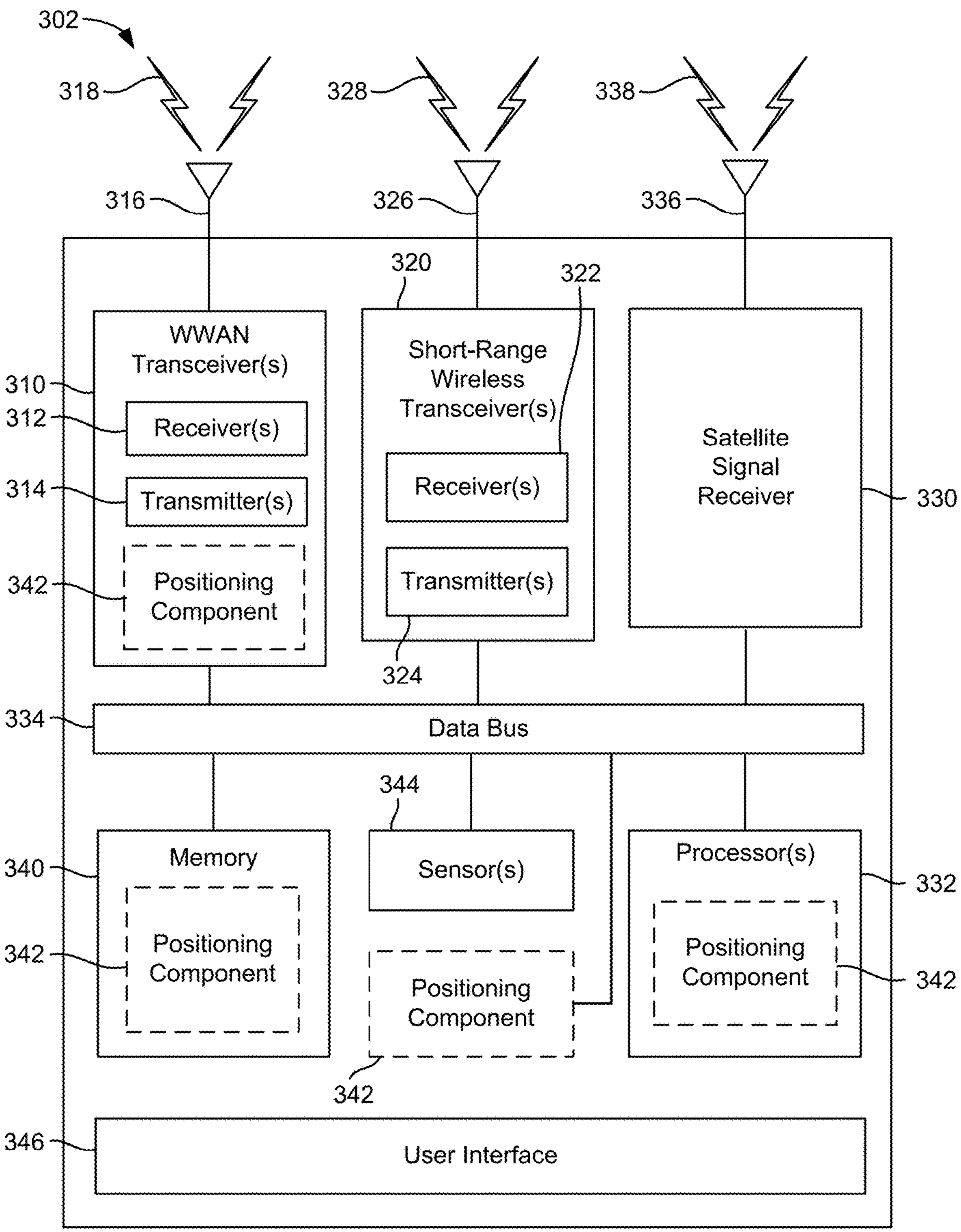
FIGS. 3A, 3B, and 3C are simplified block diagrams of several sample aspects of components that may be employed in a user equipment (UE), a base station, and a network entity, respectively, and configured to support communications as taught herein.
Figure 3B:
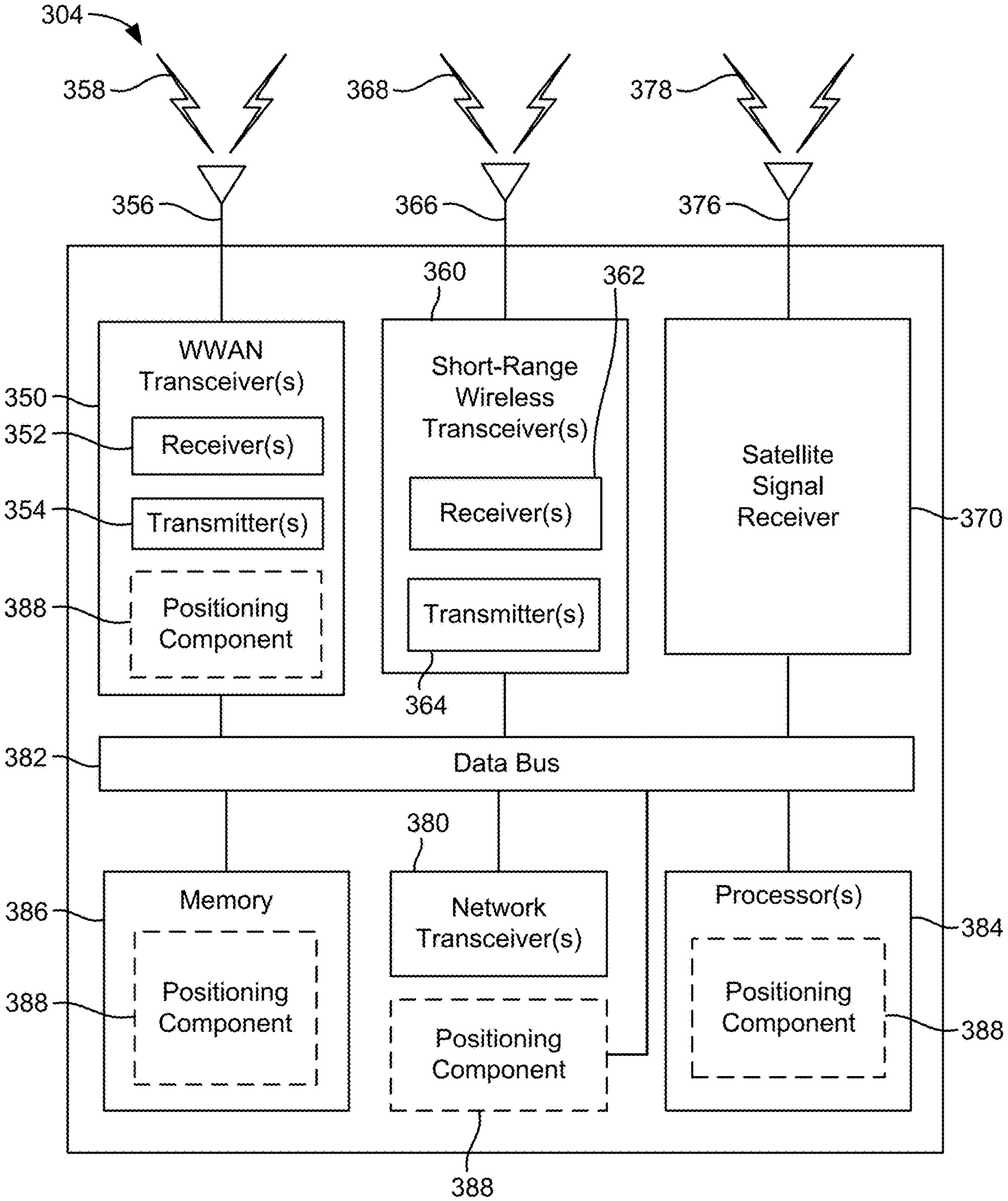
Figure 3C:
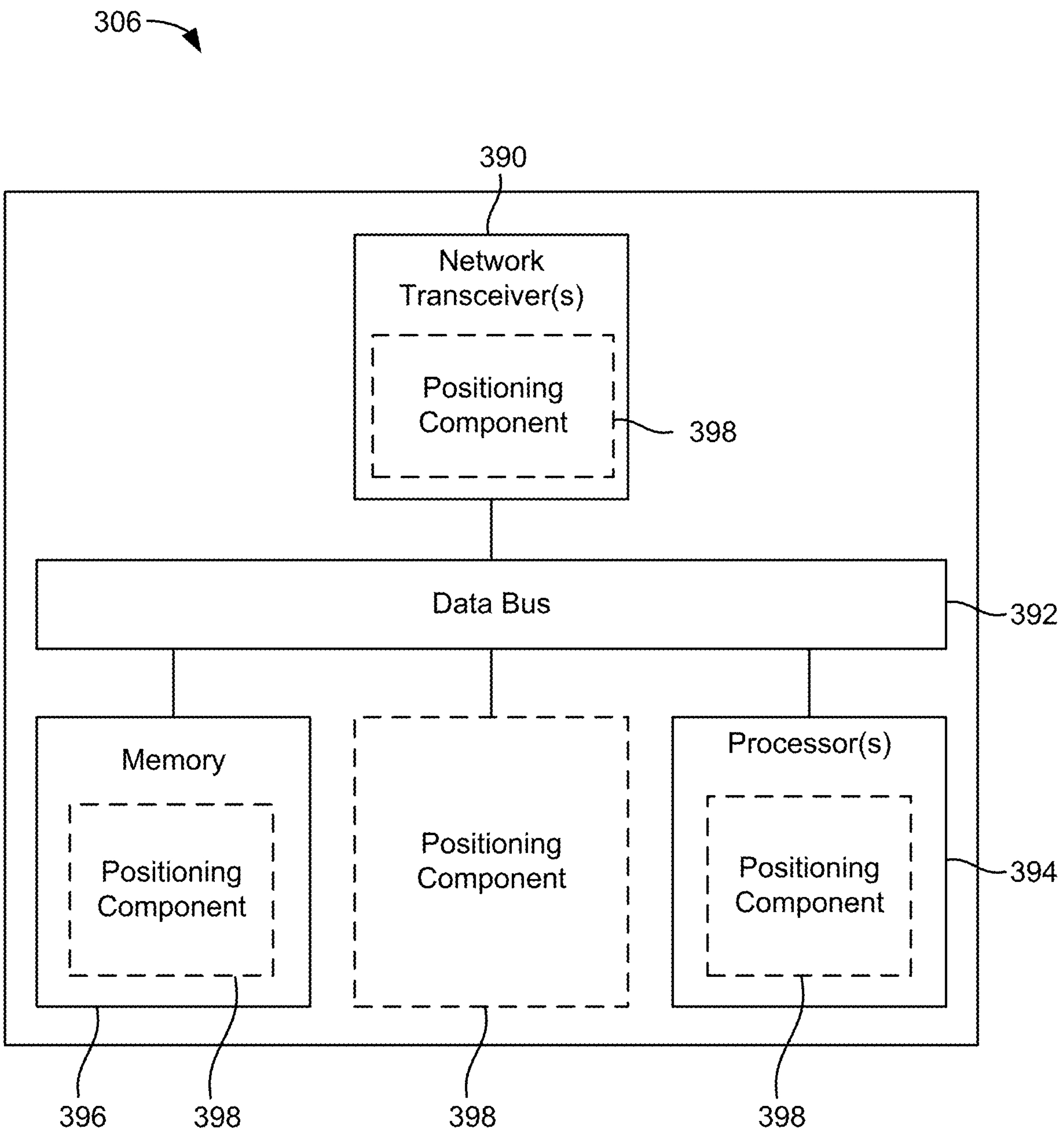

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

NR is capable of supporting various sidelink ranging and positioning techniques. Sidelink-based ranging enables the determination of the relative distance(s) between UEs and optionally their absolute position(s), where the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available. Sidelink-based ranging can be accomplished using a three-way handshake for session establishment, followed by the exchange of positioning reference signals (PRS), and concluded by messaging to exchange measurements based on PRS transmission and receipt from peer UEs.

Sidelink ranging is based on calculating an inter-UE round-trip-time (RTT) measurement, as determined from the transmit and receive times of PRS (a wideband positioning signal defined in LTE and NR). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

Figure 4:
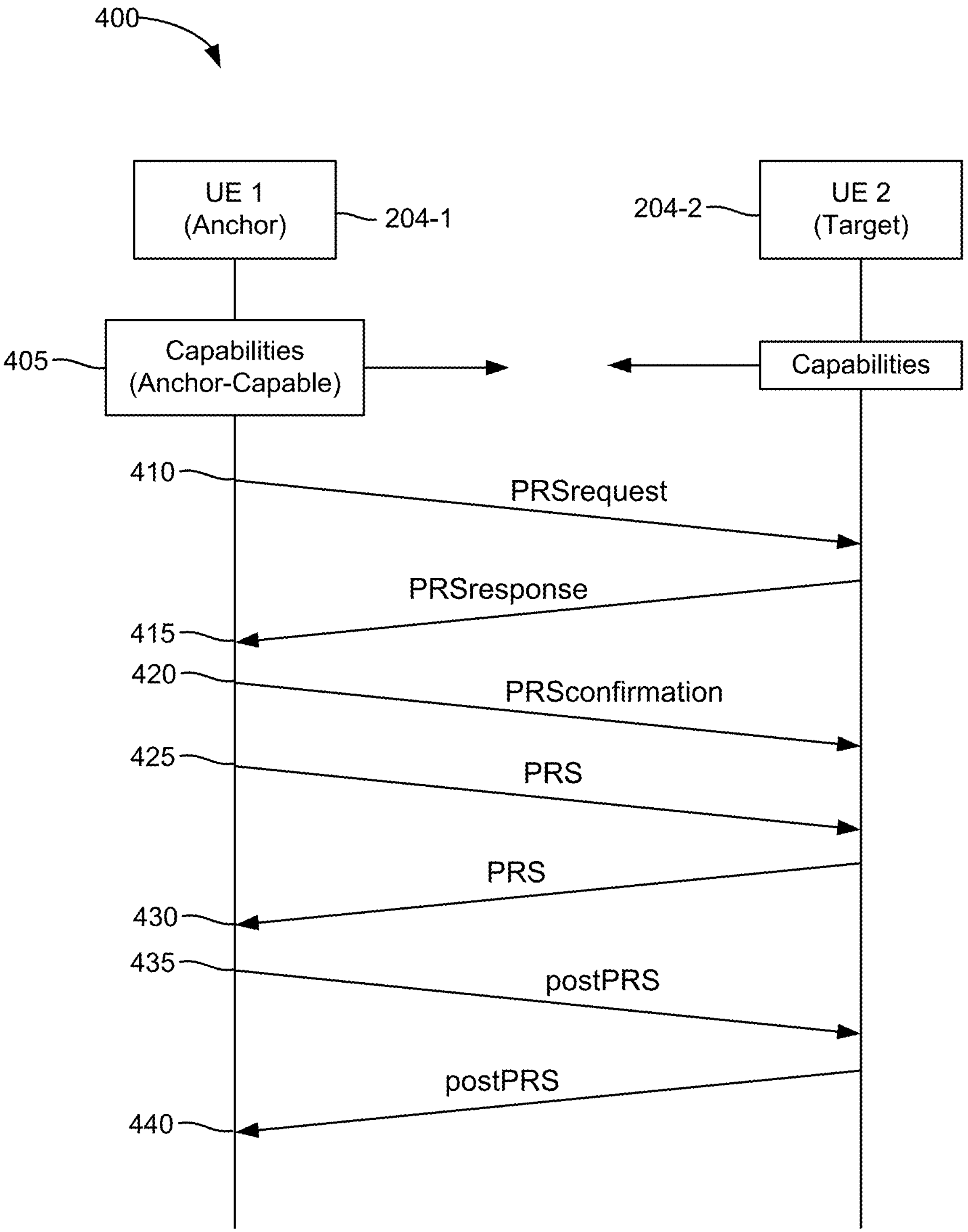
FIG. 4 is a diagram illustrating an example sidelink ranging and positioning procedure, according to aspects of the disclosure.
Figure 6:
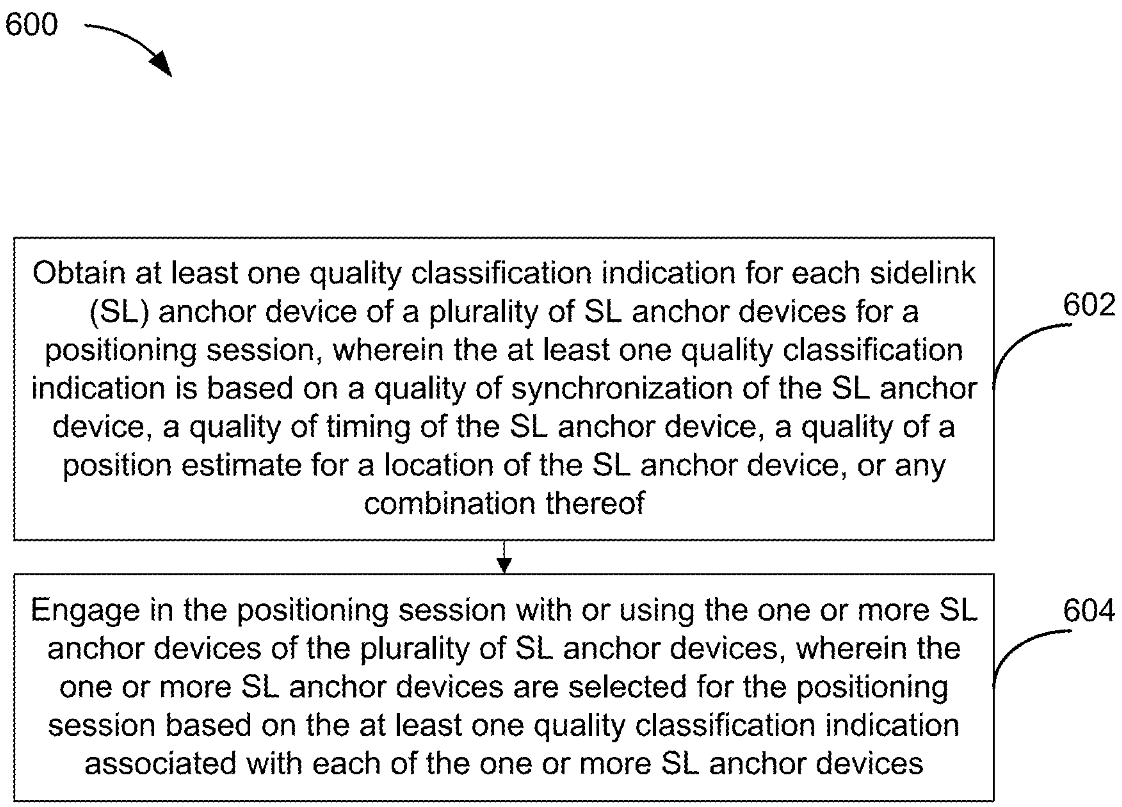
FIG. 6 illustrates an example method of wireless communication performed by a target sidelink user equipment (SL-UE) device, according to aspects of the disclosure.

FIG. 4 illustrates an example sidelink ranging and positioning procedure 400, according to aspects of the disclosure. The sidelink ranging and positioning procedure 400 may also be referred to as a sidelink RTT positioning procedure. Sidelink ranging is based on calculating an inter-UE RTT measurement, as determined from the transmit and receive times of PRS (a wideband reference signal defined in LTE and NR for positioning). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute location. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

The sidelink ranging and positioning procedure 400 (or session) begins with the broadcast of capability information by the involved peer UEs at stage 405. As shown in FIG. 4, one of the peer UEs, UE 204-1 (e.g., any of the sidelink-capable UEs described herein), is capable of being an anchor UE for the sidelink ranging and positioning procedure 400, meaning that the UE supports positioning of a target UE (e.g., by transmitting and/or receiving PRS for positioning, providing positioning-related information, etc., over the sidelink interface). As such, the anchor UE 204-1 includes an indication in its capability message(s) that it is capable of being an anchor UE for the sidelink ranging and positioning procedure 400. The other UE, UE 204-2 (e.g., any other of the sidelink-capable UEs described herein), be a target UE, meaning it has an unknown or inaccurate location and is attempting to locate its own position. Based on the capability information received from the anchor UE 204-1, indicating that the anchor UE 204-1 is an anchor UE, the target UE 204-2 knows that it will be able to determine its location based on performing the sidelink ranging and positioning procedure 400 with the anchor UE 204-1.

In accordance with various aspects of the disclosure, the capability message(s) may include various information. In an aspect, the capability message(s) may provide an indication of the location (e.g., known position or position estimate) of the anchor UE 204-1 (although the known position or position estimate associated with the anchor UE 204-1 may be obtained by the target UE 204-2 in other manners as well). In accordance with certain aspects of the disclosure, the capability message(s) may include an anchor classification associated with the anchor UE 204-1 as described in further detail herein. However, as also described herein, an indication of the anchor classification with the anchor UE 204-1 may be obtained by the target UE 204-2 in other manners.

After the initial capability exchange, the involved UEs 204 may perform a three-way messaging handshake. At stage 410, the anchor UE 204-1 transmits a PRS request (labeled "PRSrequest") to the target UE 204-2. At stage 415, the target UE 204-2 transmits a PRS response (labeled "PRSresponse") to the anchor UE 204-1. At stage 420, the anchor UE 204-1 transmits a PRS confirmation to the target UE 204-2. At this point, the three-way messaging handshake is complete. Note that although FIG. 4 illustrates the anchor UE 204-1 initiating the three-way message handshake, it may instead be initiated by the target UE 204-2.

At stages 425 and 430, the involved peer UEs 204 transmit PRS to each other. The resources on which the PRS are transmitted may be configured/allocated by the network (e.g., one of the UE's 204 serving base station) or negotiated by the UEs 204 during the three-way messaging handshake. The anchor UE 204-1 measures the transmission-to-reception (Tx-Rx) time difference between the transmission time of PRS at stage 425 and the reception time of PRS at stage 430. The target UE 204-2 measures the reception-to-transmission (Rx-Tx) time difference between the reception time of PRS at stage 425 and the transmission time of PRS at stage 430. Note that although FIG. 4 illustrates the anchor UE 204-1 transmitting PRS first, the target UE 204-2 may instead transmit PRS first.

At stages 435 and 440, the peer UEs 204 exchange their respective time difference measurements in post PRS messages (labeled "postPRS"). If the anchor UE 204-1 has not yet provided its location to the target UE 204-2, it does so at this point. Each UE 204 is then able to determine the RTT between each UE 204 based on the Tx-Rx and Rx-Tx time difference measurements (specifically, the difference between the Tx-Rx and Rx-Tx time difference measurements). Based on the RTT measurement and the speed of light, each UE 204 can then estimate the distance (or range) between the two UEs 204 (specifically, half the RTT measurement multiplied by the speed of light). Since the target UE 204-2 also has the absolute location (e.g., geographic coordinates) of the anchor UE 204-1, the target UE 204-2 can use that location and the distance to the anchor UE 204-1 to determine its absolute location.

Note that while FIG. 4 illustrates two UEs 204, a target UE (e.g., target UE 204-2) may perform, or attempt to perform, the sidelink ranging and positioning procedure 400 with multiple anchor UEs. Additionally, although the example sidelink ranging and positioning procedure 400 is based on a multi-RTT positioning scenario, the teachings disclosed herein apply to positioning techniques (e.g., time of departure (TOD), time of arrival (TOA), an angle-of-departure (AoD), angle-of-arrival (AoA), etc.) other than the multi-RTT technique shown in FIG. 4.

Certain aspects of the disclosure are implemented with a recognition that the anchor UEs chosen by the target UE for the positioning session may impact the accuracy of the positioning determinations. For example, different anchor UEs may be synchronized to different synchronization sources, have different timing accuracies, different accuracies associated with their known positions, etc.

As such, various aspects of the disclosure are directed to the criterion for selecting the SL anchor devices used by the target UE for positioning and procedures applicable to such SL anchor device selection. In an aspect, the target UE may obtain one or more quality classification indications from the sidelink (SL) anchor devices available to the target UE in the positioning environment. In an aspect, the quality classification indication may be based on 1) the quality of synchronization of the SL anchor device. 2) the quality of timing of the SL anchor device, 3) the quality of a location estimate for a position of the SL anchor device, or 4) any combination thereof.

The target UE may select which SL anchor devices the target UE will use for a positioning session based on the quality classification indications associated with the SL anchor devices. The SL anchor devices may include: 1) one or more transmission reception points (TRP), 2) one or more fixed-position anchor SL-UEs, 3) one or more mobile anchor SL-UEs, etc. In certain scenarios, the positioning environment may include a mix of any of the foregoing SL anchor device types.

Once the target UE has selected the SL anchor devices for the positioning session, it may engage the SL anchor devices in the positioning session to, for example, determine a position estimate for the target UE.

In an aspect, the classification associated with the SL anchor device may correspond to a classification related to the synchronization source(s) to which the SL anchor device is synchronized. For example, SL anchor devices synchronized to highly accurate synchronization sources have a higher quality of synchronization than SL anchor devices synchronized to less accurate synchronization sources. SL anchor devices synchronized to highly accurate synchronization sources are likely to provide more precise timing information in, for example, RTT positioning than SL anchor devices synchronized to less accurate synchronization sources. In an aspect, the target UE may favor the selection of SL anchor devices with a higher quality of synchronization over SL anchor devices with lower qualities of synchronization.

Certain classifications, such as the quality of synchronization classification, may have multiple sub-classifications that each have a corresponding priority level. FIG. 5 is a table 500 showing one manner in which an SL anchor device may be classified based on the synchronization source used by the SL anchor device, according to aspects of the disclosure. Here, the prioritization levels range from P0 to P5, where priority level P0 is associated with the highest quality of synchronization classification. In this example, an SL anchor device that is directly synchronized with a GNSS has been assigned the highest priority level P0. An SL-anchor device that is indirectly synchronized with the GNSS is assigned a priority level P1. An SL anchor device that is directly synchronized with a base station is assigned a priority level P2, while an SL anchor device that is indirectly synchronized with the base station is assigned a priority level P3. In certain scenarios, the SL anchor device may be synchronized with another synchronization source that is independent of the GNSS or base station (e.g., the SL anchor device uses its own independent synchronization source, the SL anchor device uses another device having an independent synchronization source, etc.). In table 500, an SL anchor device that is synchronized to its own independent synchronization source (e.g., the SL anchor device has an internal synchronization source) is assigned a priority level P4. An SL anchor device that is indirectly synchronized to any other independent synchronization source (e.g., the SL anchor is synchronized to another sidelink device that, in turn, is synchronized to another independent synchronization source) is assigned a priority level P5. It will be recognized, based on the teachings of the present disclosure, that the synchronization quality classification prioritization scheme set forth in table 500 is merely exemplary, and other classification priority schemes based on different synchronization sources or combinations of synchronization sources may also be used.

In accordance with certain aspects of the disclosure, the quality of synchronization classification may be based on a number of "hops" between the synchronization source and the SL anchor device. One such set of quality of synchronization classification indications may be based on the clock synchronization categories implemented in the Network Time Protocol (NTP). NTP is a networking protocol for clock synchronization between computer systems over packet-switched, variable-latency data networks. Still, the basic concepts behind its clock synchronization categories may be extended to SL anchor devices used in positioning. The NTP protocol implements an NTP Stratum model that represents the hierarchy of time servers in an NTP network, where the Stratum level (0-15) indicates the device's distance to the reference clock (e.g., synchronization reference source). The higher the Stratum number, the more the timing accuracy and stability degrades. As such, SL anchor devices associated with higher Stratum numbers may be associated with higher quality of synchronization classifications.

Various manners of assessing the quality of timing of the SL anchor device may be used when assigning a quality of timing classification to the SL anchor device. In accordance with certain aspects of the disclosure, the quality of timing of the SL anchor device may be based on 1) the clock jitter associated with the clock of the SL anchor device, 2) the clock drift associated with the clock of the SL anchor device, or 3) any combination of such clock metrics. SL anchor devices associated with higher clock stability, low clock jitter, etc., may be associated with higher quality of timing classifications.

Various manners of assessing the quality of the position of the SL anchor device may be used when assigning a quality of position classification to the SL anchor device. In an aspect, the quality of position classification may be based on whether the SL anchor device is mobile or located at a fixed position. SL anchor devices located at fixed positions are likely to have higher quality of position classifications than mobile SL anchor devices. Additionally, or in the alternative, the quality of position classification of the SL anchor device may be based on its motion relative to the target UE, where SL anchor devices that have less than motion relative to the target UE are more likely to have higher quality of position classifications than devices having more significant motion relative to the target UE. Additionally, or in the alternative, the quality of position classification of the SL anchor device may be based on an uncertainty associated with the position estimate provided for the location of the SL anchor device. SL anchor devices having less uncertainty associated with their position estimates may have higher quality of position classifications than SL anchor devices having larger uncertainties associated with their position estimates.

The quality classifications associated with the SL anchor devices may be obtained by the target UE in various manners. In certain scenarios, each SL anchor device may transmit one or more quality classifications with which the SL anchor device is associated. SL anchor devices that do not provide a quality classification indication may be assigned a default quality classification or default set of quality classifications.

The target UE may receive the quality classifications associated with each SL anchor device in various types of transmissions. In accordance with the various aspects of the disclosure, the quality classifications indications may be provided through 1) communications that take place during SL discovery operations between the target SL-UE devices and each of the one or more SL anchor devices, 2) a broadcast transmission from a master sidelink device that provides the quality classifications for all SL anchor devices in a given positioning environment, 3) broadcast transmissions from each of the SL anchor devices indicating its associated quality classification indications, 4) a groupcast transmission including quality classification indications associated with the SL anchor devices, 5) a unicast transmission from the SL anchor device including the quality classification indications associated with the SL anchor devices, or 6) any combination of the foregoing. In certain aspects, quality classification indications may be provided by the SL anchor device during a capability exchange with the target UE (e.g., a capability exchange at the start of a positioning session).

According to aspects of the disclosure, the target UE may select the SL anchor devices for the positioning session based on reference signal received power (RSRP) measurements associated with the SL anchor devices as determined at the target SL-UE. In an aspect, the RSRP may be used as an independent quality classification or combined with other criteria to modify the SL anchor device quality classifications at the target UE. The RSRP measurements may be based on measurements of 1) sidelink positioning reference signals (SL-PRS) received from the SL anchor device, 2) demodulation reference signals (DMRS) associated with a physical shared sidelink channel (PSSCH) received from the SL anchor device, 3) DMRS associated with a physical sidelink control channel (PSCCH) received from the SL anchor device, 4) DMRS associated with a physical sidelink broadcast channel (PSBCH) received from the SL anchor device, 5) Synchronization Signal Blocks (SSB) of the PSBCH received from one or more transmission reception points (TRP) that also serve as SL anchor devices, 6) downlink positioning reference signals (DL-PRS) received from the one or more TRP that also serve as SL anchor devices, or 7) any combination of the foregoing.

In some aspects of the method 600, the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

Clause 6. The method of clause 5, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

Clause 19. The target sidelink user equipment of clause 18, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

In some aspects, the method 600 includes obtaining the at least one quality classification indication for each SL anchor device comprises receiving the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

Clause 11. The method of any of clauses 1 to 10, wherein: obtaining the at least one quality classification indication for each SL anchor device comprises receiving the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

At operation 604, the target SL-UE device engages in the positioning session with or using one or more SL anchor devices of the plurality of SL anchor devices, wherein the one or more SL anchor devices are selected for the positioning session based on the at least one quality classification indication associated with each of the one or more SL anchor devices. In an aspect, operation 604 may be performed by the one or more WWAN transceivers 310, the one or more processors 332, memory 340, and/or positioning component 342, any or all of which may be considered means for performing this operation.

In some aspects, the method 600 includes determining a position estimate for the target SL-UE based on positioning reference signals (PRS) transmitted by the one or more SL anchor devices.

In some aspects of the method 600, the plurality of SL anchor devices comprises: at least one transmission reception point (TRP); at least one fixed-position anchor SL-UE; at least one mobile anchor SL-UE; or any combination thereof.

In some aspects of the method 600, the at least one quality classification indication is based on a quality classification having multiple sub-classifications; each sub-classification of the multiple sub-classifications is associated with a priority level; and the one or more SL anchor devices are selected, at least in part, based on the priority level of a sub-classification associated with each of the one or more SL anchor devices.

In some aspects of the method 600, selection of the one or more SL anchor devices for the positioning session is further based on reference signal received power (RSRP) measurements associated with the one or more SL anchor devices as determined at the target SL-UE.

In some aspects of the method 600, the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSSCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, download positioning reference signals (DL-PRS) received from the one or more TRP of the one or more SL anchor devices, or any combination thereof.

In some aspects of the method 600, the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

In some aspects of the method 600, the quality of timing of a given SL anchor device of the plurality of SL anchor devices is based at least on clock jitter associated with a clock of the given SL anchor device, clock drift associated with the clock of the given SL anchor device, or any combination thereof.

In some aspects of the method 600, the quality of the position of a given SL anchor device of the plurality of SL anchor devices is based at least on a mobility classification of the given SL anchor device, motion of the given SL anchor device relative to the target SL-UE, an uncertainty associated with a position estimate for the location of the given SL anchor device, or any combination thereof.

In some aspects, the method 600 includes obtaining the at least one quality classification indication for each SL anchor device comprises receiving an indication of the at least one quality classification indication from each of the one or more SL anchor devices.

In some aspects, the method 600 includes obtaining the at least one quality classification indication for each SL anchor device comprises inferring the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof. a resource set allocated to the one or more SL anchor devices, wherein the resource set is allocated to the one or more SL anchor devices based on a quality classification indication associated with the one or more SL anchor devices, or In some aspects, the method 600 includes obtaining the at least one quality classification indication for each SL anchor device comprises inferring the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof.a resource set allocated to the one or more SL anchor devices, wherein the resource set is allocated to the one or more SL anchor devices based on a quality classification indication associated with the one or more SL anchor devices, or In some aspects, the method 600 includes selectively including, excluding, combining, or weighting the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

As will be appreciated, a technical advantage of the method 600 is that SL anchor devices may be classified with various quality classification indications, which may be used by the target SL-UE device to optimize the selection of SL anchor devices that are used for a positioning session. Optimal selection of the SL anchor devices ensures consistent positioning and ranging quality across SL-UEs.

In the detailed description above, it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a target sidelink user equipment (SL-UE) device, comprising: obtaining at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engaging in the positioning session with or using one or more SL anchor devices of the plurality of SL anchor devices, wherein the one or more SL anchor devices are selected for the positioning session based on the at least one quality classification indication associated with each of the one or more SL anchor devices.

Clause 2. The method of clause 1, further comprising: determining a position estimate for the target SL-UE based on positioning reference signals (PRS) transmitted by the one or more SL anchor devices.

Clause 3. The method of any of clauses 1 to 2, wherein the plurality of SL anchor devices comprises: at least one transmission reception point (TRP); at least one fixed-position anchor SL-UE; at least one mobile anchor SL-UE; or any combination thereof.

Clause 4. The method of any of clauses 1 to 3, wherein: the at least one quality classification indication is based on a quality classification having multiple sub-classifications; each sub-classification of the multiple sub-classifications is associated with a priority level; and the one or more SL anchor devices are selected, at least in part, based on the priority level of a sub-classification associated with each of the one or more SL anchor devices.

Clause 5. The method of any of clauses 1 to 4, wherein: selection of the one or more SL anchor devices for the positioning session is further based on reference signal received power (RSRP) measurements associated with the one or more SL anchor devices as determined at the target SL-UE.

Clause 6. The method of clause 5, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSSCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, download positioning reference signals (DL-PRS) received from the one or more TRP of the one or more SL anchor devices, or any combination thereof.

Clause 7. The method of any of clauses 1 to 6, wherein: the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

Clause 8. The method of any of clauses 1 to 7, wherein: the quality of timing of a given SL anchor device of the plurality of SL anchor devices is based at least on clock jitter associated with a clock of the given SL anchor device, clock drift associated with the clock of the given SL anchor device, or any combination thereof.

Clause 9. The method of any of clauses 1 to 8, wherein: the quality of the position of a given SL anchor device of the plurality of SL anchor devices is based at least on a mobility classification of the given SL anchor device, motion of the given SL anchor device relative to the target SL-UE, an uncertainty associated with a position estimate for the location of the given SL anchor device, or any combination thereof.

Clause 10. The method of any of clauses 1 to 9, wherein: obtaining the at least one quality classification indication for each SL anchor device comprises receiving an indication of the at least one quality classification indication from each of the one or more SL anchor devices.

Clause 11. The method of any of clauses 1 to 10, wherein: obtaining the at least one quality classification indication for each SL anchor device comprises receiving the at least one quality classification indication in SL discovery operations between the target SL devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

Clause 12. The method of any of clauses 1 to 11, wherein: obtaining the at least one quality classification indication for each SL anchor device comprises inferring the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof.

Clause 13. The method of any of clauses 1 to 12, further comprising: selectively including, excluding, combining, or weighting the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

Clause 14. A target sidelink user equipment, comprising: a memory; at least one transceiver; and at least one processor communicatively coupled to the memory and the at least one transceiver, the at least one processor configured to: obtain at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices.

Clause 15. The target sidelink user equipment of clause 14, wherein the at least one processor is further configured to: determine a position estimate for the target SL-UE based on positioning reference signals (PRS) transmitted by the one or more SL anchor devices.

Clause 16. The target sidelink user equipment of any of clauses 14 to 15, wherein the plurality of SL anchor devices comprises: at least one transmission reception point (TRP); at least one fixed-position anchor SL-UE; at least one mobile anchor SL-UE; or any combination thereof.

Clause 17. The target sidelink user equipment of any of clauses 14 to 16, wherein: the at least one quality classification indication is based on a quality classification having multiple sub-classifications; each sub-classification of the multiple sub-classifications is associated with a priority level; and the one or more SL anchor devices are selected, at least in part, based on the priority level of a sub-classification associated with each of the one or more SL anchor devices.

Clause 18. The target sidelink user equipment of any of clauses 14 to 17, wherein: selection of the one or more SL anchor devices for the positioning session is further based on reference signal received power (RSRP) measurements associated with the one or more SL anchor devices as determined at the target SL-UE.

Clause 19. The target sidelink user equipment of clause 18, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSSCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, download positioning reference signals (DL-PRS) received from the one or more TRP of the one or more SL anchor devices, or any combination thereof.

Clause 20. The target sidelink user equipment of any of clauses 14 to 19, wherein: the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

Clause 21. The target sidelink user equipment of any of clauses 14 to 20, wherein: the quality of timing of a given SL anchor device of the plurality of SL anchor devices is based at least on clock jitter associated with a clock of the given SL anchor device, clock drift associated with the clock of the given SL anchor device, or any combination thereof.

Clause 22. The target sidelink user equipment of any of clauses 14 to 21, wherein: the quality of the position of a given SL anchor device of the plurality of SL anchor devices is based at least on a mobility classification of the given SL anchor device, motion of the given SL anchor device relative to the target SL-UE, an uncertainty associated with a position estimate for the location of the given SL anchor device, or any combination thereof.

Clause 23. The target sidelink user equipment of any of clauses 14 to 22, wherein: obtain the at least one quality classification indication for each SL anchor device comprises receiving an indication of the at least one quality classification indication from each of the one or more SL anchor devices.

Clause 24. The target sidelink user equipment of any of clauses 14 to 23, wherein: the at least one processor configured to obtain the at least one quality classification indication for each SL anchor device comprises the at least one processor configured to receive, via the at least one transceiver, the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

Clause 32. The target sidelink user equipment of clause 31, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

Clause 26. The target sidelink user equipment of any of clauses 14 to 25, wherein the at least one processor is further configured to: selectively include, exclude, combine, or weight the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

Clause 27. A target sidelink user equipment, comprising: means for obtaining at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and means for engaging in the positioning session with or using one or more SL anchor devices of the plurality of SL anchor devices, wherein the one or more SL anchor devices are selected for the positioning session based on the at least one quality classification indication associated with each of the one or more SL anchor devices.

Clause 28. The target sidelink user equipment of clause 27, further comprising: means for determining a position estimate for the target SL-UE based on positioning reference signals (PRS) transmitted by the one or more SL anchor devices.

Clause 29. The target sidelink user equipment of any of clauses 27 to 28, wherein the plurality of SL anchor devices comprises: at least one transmission reception point (TRP); at least one fixed-position anchor SL-UE; at least one mobile anchor SL-UE; or any combination thereof.

Clause 30. The target sidelink user equipment of any of clauses 27 to 29, wherein: the at least one quality classification indication is based on a quality classification having multiple sub-classifications; each sub-classification of the multiple sub-classifications is associated with a priority level; and the one or more SL anchor devices are selected, at least in part, based on the priority level of a sub-classification associated with each of the one or more SL anchor devices.

Clause 31. The target sidelink user equipment of any of clauses 27 to 30, wherein: selection of the one or more SL anchor devices for the positioning session is further based on reference signal received power (RSRP) measurements associated with the one or more SL anchor devices as determined at the target SL-UE.

Clause 32. The target sidelink user equipment of clause 31, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSSCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, download positioning reference signals (DL-PRS) received from the one or more TRP of the one or more SL anchor devices, or any combination thereof.

Clause 33. The target sidelink user equipment of any of clauses 27 to 32, wherein: the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

Clause 34. The target sidelink user equipment of any of clauses 27 to 33, wherein: the quality of timing of a given SL anchor device of the plurality of SL anchor devices is based at least on clock jitter associated with a clock of the given SL anchor device, clock drift associated with the clock of the given SL anchor device, or any combination thereof.

Clause 35. The target sidelink user equipment of any of clauses 27 to 34, wherein: the quality of the position of a given SL anchor device of the plurality of SL anchor devices is based at least on a mobility classification of the given SL anchor device, motion of the given SL anchor device relative to the target SL-UE, an uncertainty associated with a position estimate for the location of the given SL anchor device, or any combination thereof.

Clause 36. The target sidelink user equipment of any of clauses 27 to 35, wherein: means for obtaining the at least one quality classification indication for each SL anchor device comprises means for receiving an indication of the at least one quality classification indication from each of the one or more SL anchor devices.

Clause 37. The target sidelink user equipment of any of clauses 27 to 36, wherein: means for obtaining the at least one quality classification indication for each SL anchor device comprises means for receiving the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

Clause 45. The non-transitory computer-readable medium of clause 44, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

Clause 39. The target sidelink user equipment of any of clauses 27 to 38, further comprising: means for selectively including, excluding, combining, or weighting the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

Clause 40. A non-transitory computer-readable medium storing computer-executable instructions that, when executed by a target sidelink user equipment, cause the target sidelink user equipment to: obtain at least one quality classification indication for each sidelink (SL) anchor device of a plurality of SL anchor devices for a positioning session, wherein the at least one quality classification indication is based on a quality of synchronization of the SL anchor device, a quality of timing of the SL anchor device, a quality of a position estimate for a location of the SL anchor device, or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices.

Clause 41. The non-transitory computer-readable medium of clause 40, further comprising computer-executable instructions that, when executed by the target sidelink user equipment, cause the target sidelink user equipment to: determine a position estimate for the target SL-UE based on positioning reference signals (PRS) transmitted by the one or more SL anchor devices.

Clause 42. The non-transitory computer-readable medium of any of clauses 40 to 41, wherein the plurality of SL anchor devices comprises: at least one transmission reception point (TRP); at least one fixed-position anchor SL-UE; at least one mobile anchor SL-UE; or any combination thereof.

Clause 43. The non-transitory computer-readable medium of any of clauses 40 to 42, wherein: the at least one quality classification indication is based on a quality classification having multiple sub-classifications; each sub-classification of the multiple sub-classifications is associated with a priority level; and the one or more SL anchor devices are selected, at least in part, based on the priority level of a sub-classification associated with each of the one or more SL anchor devices.

Clause 44. The non-transitory computer-readable medium of any of clauses 40 to 43, wherein: selection of the one or more SL anchor devices for the positioning session is further based on reference signal received power (RSRP) measurements associated with the one or more SL anchor devices as determined at the target SL-UE.

Clause 45. The non-transitory computer-readable medium of clause 44, wherein: the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSSCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, download positioning reference signals (DL-PRS) received from the one or more TRP of the one or more SL anchor devices, or any combination thereof.

Clause 46. The non-transitory computer-readable medium of any of clauses 40 to 45, wherein: the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

Clause 47. The non-transitory computer-readable medium of any of clauses 40 to 46, wherein: the quality of timing of a given SL anchor device of the plurality of SL anchor devices is based at least on clock jitter associated with a clock of the given SL anchor device, clock drift associated with the clock of the given SL anchor device, or any combination thereof.

Clause 48. The non-transitory computer-readable medium of any of clauses 40 to 47, wherein: the quality of the position of a given SL anchor device of the plurality of SL anchor devices is based at least on a mobility classification of the given SL anchor device, motion of the given SL anchor device relative to the target SL-UE, an uncertainty associated with a position estimate for the location of the given SL anchor device, or any combination thereof.

Clause 49. The non-transitory computer-readable medium of any of clauses 40 to 48, wherein: obtain the at least one quality classification indication for each SL anchor device comprises receiving an indication of the at least one quality classification indication from each of the one or more SL anchor devices.

Clause 50. The non-transitory computer-readable medium of any of clauses 40 to 49, wherein: obtain the at least one quality classification indication for each SL anchor device comprises receiving the at least one quality classification indication in SL discovery operations between the target SL SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

Clause 51. The non-transitory computer-readable medium of any of clauses 40 to 50, wherein: obtain the at least one quality classification indication for each SL anchor device comprises inferring the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof.

Clause 52. The non-transitory computer-readable medium of any of clauses 40 to 51, further comprising computer-executable instructions that, when executed by the target sidelink user equipment, cause the target sidelink user equipment to: selectively include, excluding, combining, or weighting the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a target sidelink user equipment (SL-UE) device, comprising:

obtaining at least one quality classification indication for each sidelink (SL) anchor device of a plurality of SL anchor devices for a positioning session, wherein the at least one quality classification indication is based on a combination of at least two quality factors, including:

a quality of synchronization of the SL anchor device;

a quality of timing of the SL anchor device;

a quality of a position estimate for a location of the SL anchor device;

wherein different quality factors of the combination are selectively treated as having different levels of importance when selecting one or more SL anchor devices for the positioning session, wherein obtaining the at least one quality classification indication comprises:

receiving the at least one quality classification indication from at least one of the plurality of SL anchor devices via sidelink signaling;

inferring the at least one quality classification indication based on sidelink control signaling or resource configuration associated with the SL anchor device; or any combination thereof; and engaging in the positioning session with or using one or more SL anchor devices of the plurality of SL anchor devices, wherein the one or more SL anchor devices are selected for the positioning session based on the at least one quality classification indication associated with each of the one or more SL anchor devices, and wherein engaging in the positioning session with or using the one or more SL anchor devices comprises using the one or more SL anchor devices to determine a position estimate for the target SL-UE device.

2. The method of claim 1, further comprising:

determining a position estimate for the target SL-UE device based on positioning reference signals (PRS) transmitted by the one or more SL anchor devices.

3. The method of claim 1, wherein the plurality of SL anchor devices comprises:

at least one transmission reception point (TRP);

at least one fixed-position anchor SL-UE;

at least one mobile anchor SL-UE; or any combination thereof.

4. The method of claim 1, wherein:

the at least one quality classification indication is based on a quality classification having multiple sub-classifications;

each sub-classification of the multiple sub-classifications is associated with a priority level; and the one or more SL anchor devices are selected, at least in part, based on the priority level of a sub-classification associated with each of the one or more SL anchor devices.

5. The method of claim 1, wherein:

selection of the one or more SL anchor devices for the positioning session is further based on reference signal received power (RSRP) measurements associated with the one or more SL anchor devices as determined at the target SL-UE device.

6. The method of claim 5, wherein:

the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel PSCCH received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

7. The method of claim 1, wherein:

the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

8. The method of claim 1, wherein:

the quality of timing of a given SL anchor device of the plurality of SL anchor devices is based at least on clock jitter associated with a clock of the given SL anchor device, clock drift associated with the clock of the given SL anchor device, or any combination thereof.

9. The method of claim 1, wherein:

the quality of the position estimate of a given SL anchor device of the plurality of SL anchor devices is based at least on a mobility classification of the given SL anchor device, motion of the given SL anchor device relative to the target SL-UE device, an uncertainty associated with a position estimate for the location of the given SL anchor device, or any combination thereof.

10. The method of claim 1, wherein:

obtaining the at least one quality classification indication for each SL anchor device comprises receiving an indication of the at least one quality classification indication from each of the one or more SL anchor devices.

11. The method of claim 1, wherein:

obtaining the at least one quality classification indication for each SL anchor device comprises receiving the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

12. The method of claim 1, wherein:

obtaining the at least one quality classification indication for each SL anchor device further comprises inferring the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof.

13. The method of claim 1, further comprising:

selectively including, excluding, combining, or weighting the at least one quality classification indication for each sidelink (SL) anchor device of the plurality of SL anchor devices to select the one or more SL anchor devices for the positioning session based on a prioritized quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

14. A target sidelink user equipment (SL-UE) device, comprising:

a memory;

at least one transceiver; and at least one processor communicatively coupled to the memory and the at least one transceiver, the at least one processor configured to:

obtain at least one quality classification indication for each sidelink (SL) anchor device of a plurality of SL anchor devices for a positioning session, wherein the at least one quality classification indication is based on a combination of at least two quality factors, including:

a quality of synchronization of the SL anchor device;

a quality of timing of the SL anchor device; or a quality of a position estimate for a location of the SL anchor device;

wherein different quality factors of the combination are selectively treated as having different levels of importance when selecting one or more SL anchor devices for the positioning session, wherein obtaining the at least one quality classification indication comprises:

receiving the at least one quality classification indication from at least one of the plurality of SL anchor devices via sidelink signaling;

inferring the at least one quality classification indication based on sidelink control signaling or resource configuration associated with the SL anchor device; or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices, and wherein engaging in the positioning session with or using the one or more SL anchor devices comprises using the one or more SL anchor devices to determine a position estimate for the target SL-UE device.

15. The target SL-UE device of claim 14, wherein the at least one processor is further configured to:

determine a position estimate for the target SL-UE device based on positioning reference signals (PRS) transmitted by the one or more SL anchor devices.

16. The target SL-UE device of claim 14, wherein the plurality of SL anchor devices comprises:

at least one transmission reception point (TRP);

at least one fixed-position anchor SL-UE;

at least one mobile anchor SL-UE; or any combination thereof.

17. The target SL-UE device of claim 14, wherein:

the at least one quality classification indication is based on a quality classification having multiple sub-classifications;

each sub-classification of the multiple sub-classifications is associated with a priority level; and the one or more SL anchor devices are selected, at least in part, based on the priority level of a sub-classification associated with each of the one or more SL anchor devices.

18. The target SL-UE device of claim 14, wherein:

selection of the one or more SL anchor devices for the positioning session is further based on reference signal received power (RSRP) measurements associated with the one or more SL anchor devices as determined at the target SL-UE device.

19. The target SL-UE device of claim 18, wherein:

the RSRP measurements are based on measurements of sidelink positioning reference signals (SL-PRS) received from the one or more SL anchor devices, demodulation reference signals (DMRS) associated with a physical shared sidelink channel (PSSCH) received from the one or more SL anchor devices, DMRS associated with a physical sidelink control channel (PSCCH) received from the one or more SL anchor devices, DMRS associated with a physical sidelink broadcast channel (PSBCH) received from the one or more SL anchor devices, Synchronization Signal Blocks (SSB) of the PSBCH received from one or more transmission reception points (TRP) of the one or more SL anchor devices, downlink positioning reference signals (DL-PRS) received from the one or more TRP of the one or more SL anchor devices, or any combination thereof.

20. The target SL-UE device of claim 14, wherein:

the quality of synchronization of a given SL anchor device of the plurality of SL anchor devices is based at least on a classification of a synchronization source used by the given SL anchor device, the classification of the synchronization source being based on direct synchronization of the given SL anchor device with a global navigation satellite system (GNSS), indirect synchronization of the given SL anchor device with the GNSS, direct synchronization of the given SL anchor device with a base station, indirect synchronization of the given SL anchor device with the base station, synchronization of the given SL anchor device with other synchronization sources, or any combination thereof.

21. The target SL-UE device of claim 14, wherein:

the quality of timing of a given SL anchor device of the plurality of SL anchor devices is based at least on clock jitter associated with a clock of the given SL anchor device, clock drift associated with the clock of the given SL anchor device, or any combination thereof.

22. The target SL-UE device of claim 14, wherein:

the quality of the position estimate of a given SL anchor device of the plurality of SL anchor devices is based at least on a mobility classification of the given SL anchor device, motion of the given SL anchor device relative to the target SL-UE device, an uncertainty associated with a position estimate for the location of the given SL anchor device, or any combination thereof.

23. The target SL-UE device of claim 14, wherein:

the at least one processor configured to obtain the at least one quality classification indication for each SL anchor device comprises the at least one processor configured to receive, via the at least one transceiver, an indication of the at least one quality classification indication from each of the one or more SL anchor devices.

24. The target SL-UE device of claim 14, wherein:

the at least one processor configured to obtain the at least one quality classification indication for each SL anchor device comprises the at least one processor configured to receive, via the at least one transceiver, receiving the at least one quality classification indication in SL discovery operations between the target SL-UE devices and each of the one or more SL anchor devices, a broadcast transmission including the at least one quality classification indication associated with the one or more SL anchor devices, a groupcast transmission including the at least one quality classification indication associated with the one or more SL anchor devices, a unicast transmission including the at least one quality classification indication associated with the one or more SL anchor devices, or any combination thereof.

25. The target SL-UE device of claim 14, wherein:

the at least one processor configured to obtain the at least one quality classification indication for each SL anchor device comprises the at least one processor configured to infer the at least one quality classification indication from control signaling associated with positioning reference signal (PRS) transmissions by the one or more SL anchor devices, a resource set allocated to the one or more SL anchor devices, wherein the resource set is allocated to the one or more SL anchor devices based on a quality classification indication associated with the one or more SL anchor devices, or any combination thereof.

26. The target SL-UE device of claim 14, wherein the at least one processor is further configured to:

selectively include, exclude, combine, or weight the at least one quality classification indication for each sidelink (SL) anchor device of the plurality of SL anchor devices to select the one or more SL anchor devices for the positioning session based on a quality classification configuration implemented at the target SL-UE device, power consumption requirements of the target SL-UE device, a positioning method used by the target SL-UE device for determining a position estimate of the target SL-UE device during the positioning session, how often SL-PRS are transmitted by each of the one or more SL anchor devices, an amount of communication traffic handled by each of the one or more SL anchor devices, or any combination thereof.

27. A target sidelink user equipment (SL-UE) device, comprising:

means for obtaining at least one quality classification indication for each sidelink (SL) anchor device of a plurality of SL anchor devices for a positioning session, wherein the at least one quality classification indication is based on a combination of at least two quality factors, including:

a quality of synchronization of the SL anchor device;

a quality of timing of the SL anchor device; or a quality of a position estimate for a location of the SL anchor device;

wherein different quality factors of the combination are selectively treated as having different levels of importance when selecting one or more SL anchor devices for the positioning session, wherein the means for obtaining the at least one quality classification indication comprises:

means for receiving the at least one quality classification indication from at least one of the plurality of SL anchor devices via sidelink signaling;

means for inferring the at least one quality classification indication based on sidelink control signaling or resource configuration associated with the SL anchor device; or any combination thereof; and means for engaging in the positioning session with or using one or more SL anchor devices of the plurality of SL anchor devices, wherein the one or more SL anchor devices are selected for the positioning session based on the at least one quality classification indication associated with each of the one or more SL anchor devices, and wherein the means for engaging in the positioning session with or using the one or more SL anchor devices comprises means for using the one or more SL anchor devices to determine a position estimate for the target SL-UE device.

28. The target SL-UE device of claim 27, further comprising:

means for determining a position estimate for the target SL-UE device based on positioning reference signals (PRS) transmitted by the one or more SL anchor devices.

29. The target SL-UE device of claim 27, wherein the plurality of SL anchor devices comprises:

at least one transmission reception point (TRP);

at least one fixed-position anchor SL-UE;

at least one mobile anchor SL-UE; or any combination thereof.

30. A target sidelink user equipment (SL-UE), comprising:

a memory;

at least one transceiver; and at least one processor communicatively coupled to the memory and the at least one transceiver, the at least one processor configured to:

obtain at least one quality classification indication for each sidelink (SL) anchor device of a plurality of SL anchor devices for a positioning session, wherein the at least one quality classification indication is based on a combination of at least two quality factors:

a quality of synchronization of the SL anchor device;

a quality of timing of the SL anchor device;

a quality of a position estimate for a location of the SL anchor device; or any combination thereof; and wherein different quality factors of the combination are selectively treated as having different levels of importance when selecting one or more SL anchor devices for the positioning session, wherein obtaining the at least one quality classification indication comprises:

receiving the at least one quality classification indication from at least one of the plurality of SL anchor devices via sidelink signaling;

inferring the at least one quality classification indication based on sidelink control signaling or resource configuration associated with the SL anchor device; or any combination thereof; and engage in the positioning session with or using one or more SL anchor devices of the plurality of SL anchor devices, wherein the one or more SL anchor devices are selected for the positioning session based on the at least one quality classification indication associated with each of the one or more SL anchor devices, wherein the at least one quality classification indication is based on a quality classification having multiple sub-classifications;

each sub-classification of the multiple sub-classifications is associated with a priority level; and the one or more SL anchor devices are selected, at least in part, based on the priority level of a sub-classification associated with each of the one or more SL anchor devices.

* * * * *